United States Patent [19]
Lipschutz

[11] 3,919,868
[45] Nov. 18, 1975

[54] ANTI-THEFT DEVICE FOR MACHINES EQUIPPED WITH A DIESEL OR LIKE ENGINE

[75] Inventor: Paul Lipschutz, Croissy-sur-Seine, France

[73] Assignee: Societe d'Exploitation des Brevets, NEIMAN, Courbevoie, France

[22] Filed: Jan. 23, 1975

[21] Appl. No.: 543,290

[30] Foreign Application Priority Data
Feb. 6, 1974  France .............................. 74.03899

[52] U.S. Cl. ...................... 70/239; 70/243; 70/252; 70/257; 180/114
[51] Int. Cl.² .................... B60R 25/02; B60R 25/04
[58] Field of Search ............ 70/238, 239, 243, 252, 70/256, 257; 180/114

[56] References Cited
UNITED STATES PATENTS

| 3,236,077 | 2/1966 | Moss | 70/239 |
| 3,797,287 | 3/1974 | Iba et al. | 70/239 |

FOREIGN PATENTS OR APPLICATIONS

| 506,781 | 9/1930 | Germany | 70/238 |
| 1,191,444 | 5/1970 | United Kingdom | 70/238 |

Primary Examiner—Albert G. Craig, Jr.
Attorney, Agent, or Firm—Nolte and Nolte

[57] ABSTRACT

A locking device for a vehicle having an internal combustion engine and a fuel injection pump is effective to lock an element of the vehicle necessary for its safe operation, such as the steering column, and to render the vehicle inoperative. Means are provided to preclude the possibility that the steering column or other element be locked while the pump is operative.

9 Claims, 7 Drawing Figures

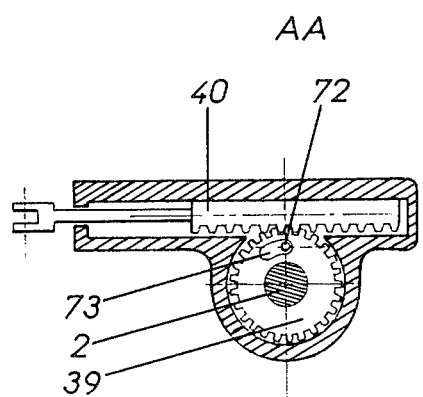
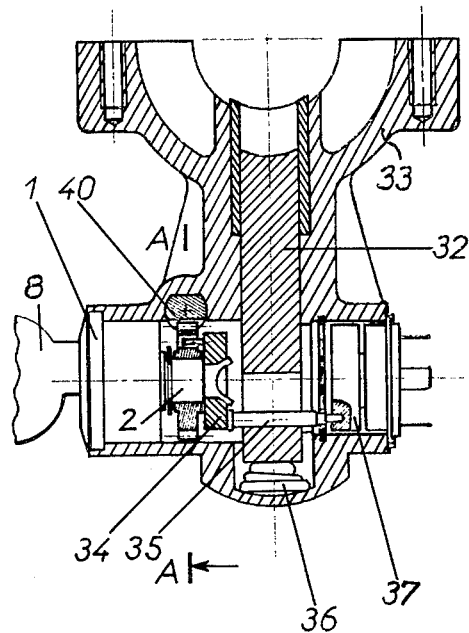
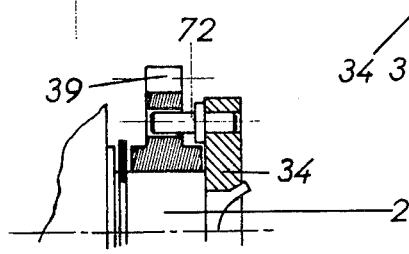
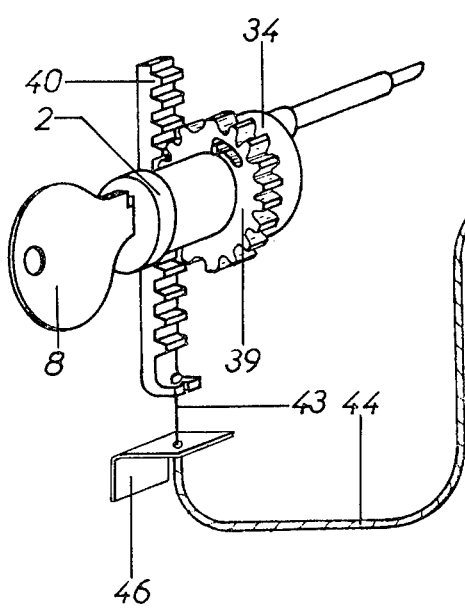
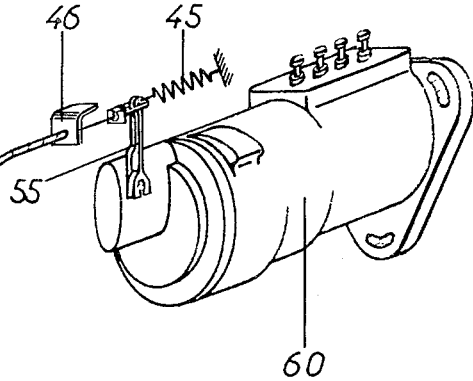

ANTI-THEFT DEVICE FOR MACHINES EQUIPPED WITH A DIESEL OR LIKE ENGINE

An anti-theft device for vehicles having an internal combustion engine supplied by an injection pump (for example a diesel engine), wherein there is a direct connection between the key actuating the anti-theft device and a mechanism opening and closing the injection pump, whereby there is a complete interdependence between the key and said pump.

In order to understand the problem it must be realized that it concerns a problem of safety.

Indeed, it is absolutely necessary to avoid locking an important part of the vehicle as, for example, the steering, transmission, brakes, etc. while the vehicle is being driven by its engine in operation.

In the case of an engine having an electric ignition this problem is easy to solve. It is sufficient to provide in the anti-theft device an automatic breaking of the ignition circuit before an important part is locked.

Specialists are perfectly aware that in the case of a diesel engine, for example, it is much more difficult to design an anti-theft device guaranteeing safety, since there is no ignition circuit and the engine is started up or stopped by an independent mechanical action on an injection pump.

In order to ensure that this action is related to the anti-theft device, many solutions have been proposed in which are employed electromagnetic devices, servomotors, solenoids, etc, in indirect connection with the switch of the anti-theft device.

An object of the present invention is to simplify the aforementioned systems by providing an absolutely reliable solution avoiding the use of additional electrical circuits, contacts, relays or servomotors, etc.

The anti-theft device according to the invention has a system which is directly actuated by the key of the anti-theft device and mechanically controls the opening and closing of the injection pump by mere rotation of said key from the "STOP" position to the "RUNNING" position. In a preferred embodiment, the injection pump is opened with a delay with respect to the withdrawal of the bolt so that the bolt is unlocked before the injection pump is opened. On the other hand, when the key returns from the "RUNNING" position to the "STOP" position, the engine stops before the locking of the steering or other essential part starts. If need be, this mechanism is provided with return means (spring or the like).

Note that there is no additional movement added to the operation of conventional anti-theft devices employed for petrol vehicles. The injection pump is opened automatically by mere rotation of the key since the device according to the invention provides a mechanical inter-dependence between the key of the anti-theft device and both the locking bolt and the injection pump.

In order to illustrate the application of the principle of the invention there will now be described by way of example with reference to the accompanying drawings an embodiment of the invention to which the invention is not intended to be limited.

In the drawings:

FIG. 1 is a cross-sectional view of an antitheft device provided with a mechanism for controlling the injection pump in accordance with the invention;

FIG. 2 is a sectional view taken on line A—A of the anti-theft device shown in FIG. 1;

FIG. 3 is an enlarged view of a part of the mechanism shown in FIG. 1, and

FIGS 4, 5, 6 and 7 are diagramatic views illustrating possible embodiments of the mechanism converting a movement of rotation of the key of the anti-theft device into a linear movement controlling the injection pump.

Figure 5:
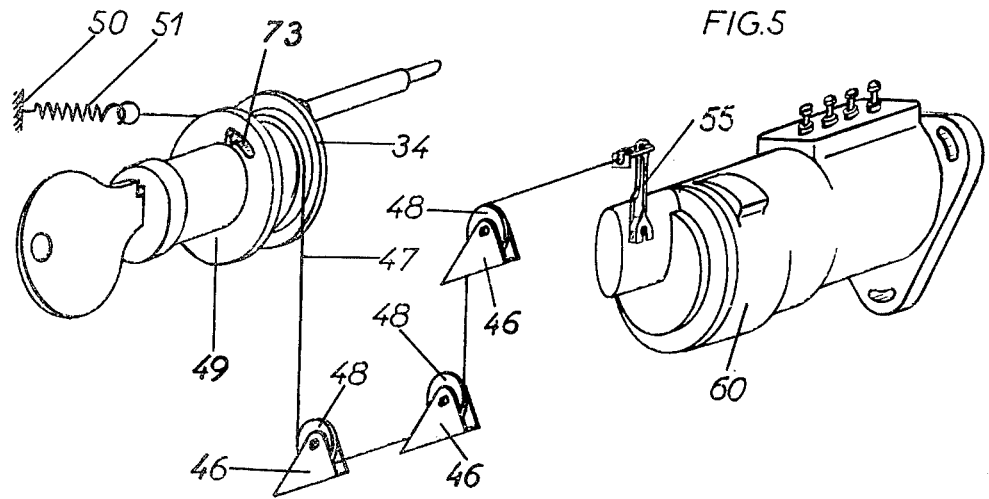

Before describing the Figures it would be well to recall the general principles underlying an automobile anti-theft device and more particularly a device mounted on the vehicle steering mechanism.

Such a device comprises a lock with its key which actuates by rotation and through a cam a locking bolt and an electric switch having one or more positions.

The conventional positions of such an anti-theft device are:

1. "STOP" position, key withdrawn, bolt engaged; electrical circuit broken;
2. "STOP" position, key non-withdrawn, bolt non-engaged; electrical circuit broken;
3. "GARAGE" position, key withdrawn, bolt non-engaged; electrical circuit broken;
4. "RUNNING" position, bolt non-engaged, ignition circuit established (key non-withdrawn);
5. "START" position, bolt non-engaged, the ignition and starting circuits established (key non-withdrawn).

Operation of the anti-theft device according to the invention and description of FIGS. 1, 2 and 3.

A stator 1 of the anti-theft device, a rotor 2, controlled by a key 8; a case 33, a bolt 32, a thrust spring 36 acting on the bolt, a plate 34 driving through a pin 35 the rotor 37 of the switch and the bolt 32 by the effect of eccentricity.

Further, the plate 34 is provided with a pin 72 which drives a pinion 39 which is freely rotatable on the rotor 2. The pinion 39 meshes with a rack 40. Thus rotation of the key 8 drives the rotor 2 which drives the plate 34 and its pin 72. The latter drives the pinion 39 and thus brings about the linear displacement of the rack 40. A slot 73 is provided in the pinion 39 to ensure a delay in the movement of the rack 40 with respect to the withdrawal of the bolt 32.

It will be understood that the structure described with reference to FIGS 1, 2 and 3 is not intended to be limitative and the pinion shifting the rack may be provided on any rotatable part of the anti-theft device.

FIG. 4 shows a control by means of a Bowden-type cable in which 60 is the injection pump, 55 the pump control lever, 2 the rotor of the anti-theft lock, 8 the key, 43 the cable, 44 its sheath, 46 supports, 45 a return spring.

FIG. 5 shows a control by means of a flexible cable. The rack and pinion are dispensed with and replaced by a drum 49. 50 is a fixed point, 51 a return spring, 47 the flexible cable or band, 46 supports for pulleys 48.

As before, a slot 73 is provided in the drum 49 to produce a delay in the displacement of the cable 47 with respect to the withdrawal of the bolt 32.

Figure 6:
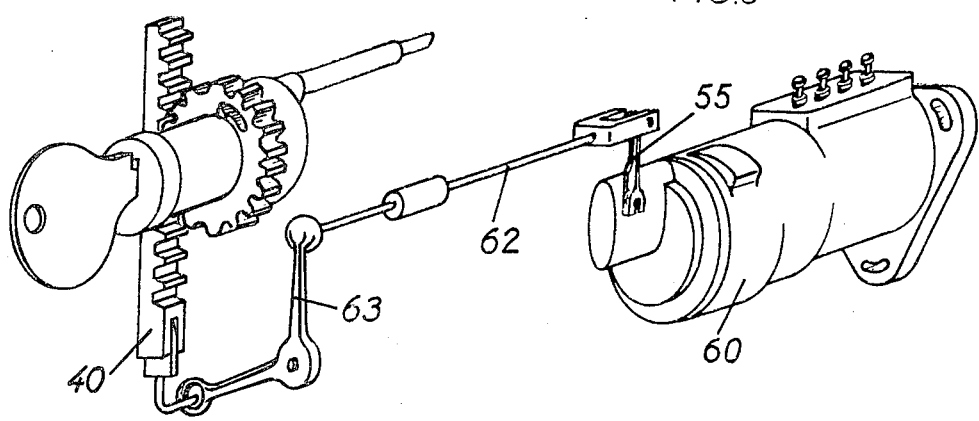

FIG. 6 shows an arrangement employing a rigid rod 62 connecting the control lever 55 to the rack 40 through a bell-crank 63. A return spring is not essential.

Figure 7:
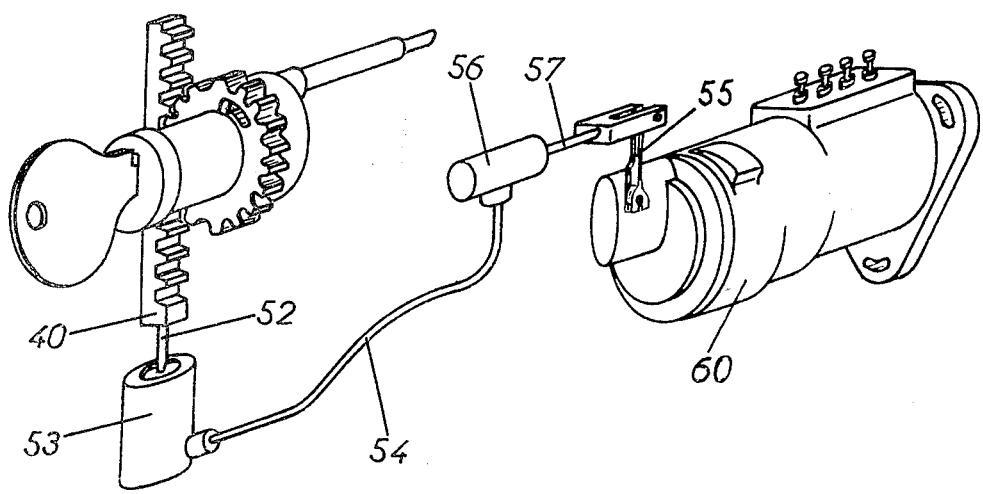

FIG. 7 shows the possibility of employing a hydraulic or pneumatic system for the transmission of the linear movement of the rack to the control lever of the injection pump. It will be understood that only the principle is shown here, since the details of this type of control are well-known.

The rack 40 is integral with a piston rod 52 which is integral with a piston (not shown) moving in a master-cylinder 53. A pipe 54 transmits the pressure to a receiver cylinder 56 to act on a piston (not shown) integral with a receiver rod 57 which acts on the lever of the pump.

It is believed that it has been clearly shown and described that the device according to the invention performs all the necessary functions of an anti-theft device including the control of the injection pump by mere rotation of the key while it affords complete safety (impossible to lock the steering mechanism with the engine running, in a vehicle having a diesel engine).

I claim:

1. An anti-theft device for a vehicle having an internal combustion engine and a fuel injection pump, said device comprising a lock, a bolt operable by said lock to be moved between locking and unlocking positions in which it locks and unlocks respectively, an element of the vehicle essential to the safe operation of that vehicle, an electrical switch operable by said lock and adapted for connection in a circuit starting said vehicle, drive means operable by said lock, drive transmitting means connected to said drive means and connectable to a fuel injection pump of a vehicle, to transmit pump opening and closing movement to said pump upon operation of said lock, said drive and drive transmitting means constituting means first causing said bolt to be moved to said unlocking position before said pump is opened as the lock is moved in a direction to cause pump opening movement of said transmission and, when said lock is moved in the direction to cause pump closing movement of said transmitting means, first causing said pump to be closed before said bolt is moved to said locking position.

2. A locking device as claimed in claim 1 including lost motion means between said lock and said drive transmitting means, said lost motion means being effective to delay activation of said drive transmitting means until said bolt is moved to said unlocking position as the lock is moved in a direction to cause opening movement of said drive transmitting means.

3. An anti-theft device as claimed in claim 1 wherein said drive means comprises a pinion rotatable by said lock and engaging a rack.

4. An anti-theft device as claimed in claim 3 wherein said lock is effective to cause rotation of a rotatable element having an eccentric, said eccentric being connected to rotate said pinion.

5. An anti-theft device as claimed in claim 4 wherein one of said eccentric element and said pinion comprises a pin and the other of said eccentric element and pinion comprises a slot within which said pin is disposed, relative movement of said eccentric element and said pinion producing lost motion as the lock is moved in the direction to cause opening movement of said drive transmitting means.

6. An anti-theft device as claimed in claim 1 wherein said drive transmitting means comprises a flexible element trained on a drum mounted for rotation upon movement of said lock.

7. An anti-theft device as claimed in claim 1 wherein said movement transmitting means comprises a fluid operated device.

8. An anti-theft device as claimed in claim 2 wherein said lost motion means comprises a pin and slot arrangement, relative movement of said pin and slot upon operation of said lock producing lost motion.

9. An anti-theft device for a vehicle having an internal combustion engine and a fuel injection pump, said device comprising a lock, a bolt operable by said lock to be moved between the locking and unlocking positions in which it locks and unlocks respectively an element of a vehicle essential to the safe operation of that vehicle, an electrical switch operable by said lock and adapted for connection to a circuit for starting said vehicle, drive means operable by said lock, drive transmitting means connected to said drive means and connectable to a fuel injection pump of said vehicle to transmit opening and closing movement to said pump upon operation of said lock, lost motion means between said lock and said drive transmitting means, said lost motion means constituting means delaying activation of said drive transmitting means until said bolt is moved to said unlocking position as the lock is moved in a direction to cause opening movement of said drive transmitting means.

* * * * *